Sept. 28, 1948.  E. N. JACOBI  2,450,144
ELECTRICAL CONTROL INSTRUMENT
Filed March 11, 1943  3 Sheets-Sheet 1
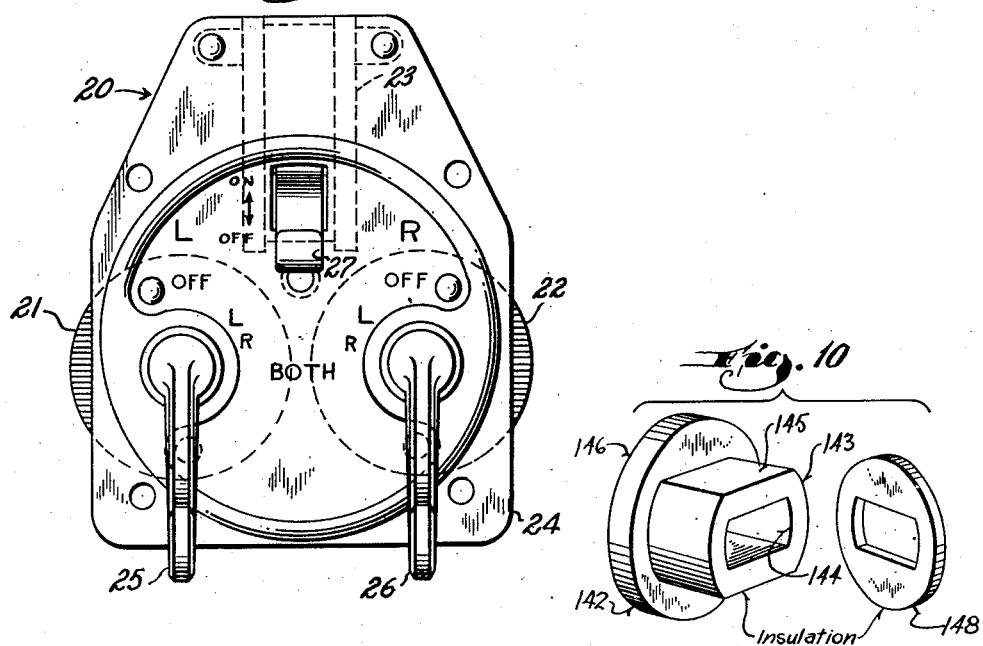
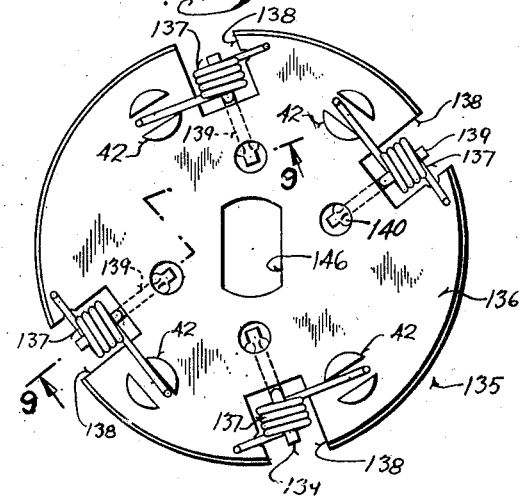
Inventor
Edward N. Jacobi
By Ira Milton Jones
Attorney Sept. 28, 1948. E. N. JACOBI 2,450,144
ELECTRICAL CONTROL INSTRUMENT
Filed March 11, 1943 3 Sheets-Sheet 2
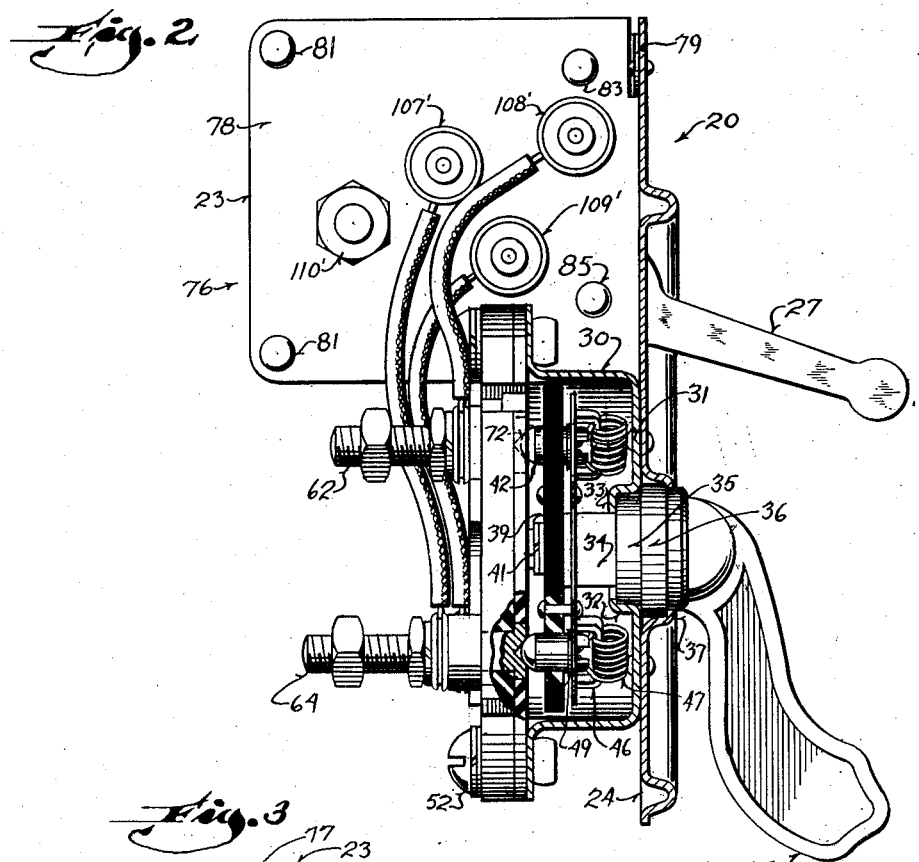
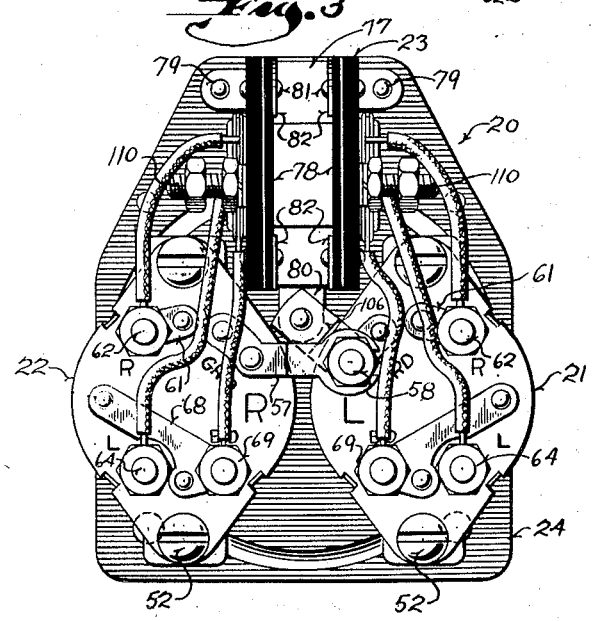
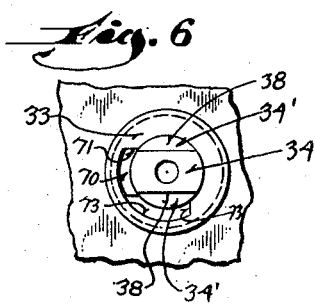
Inventor
Edward N. Jacobi
By Ira Milton Jones
Attorney Sept. 28, 1948. E. N. JACOBI 2,450,144
ELECTRICAL CONTROL INSTRUMENT
Filed March 11, 1943 3 Sheets-Sheet 3

Inventor
Edward N. Jacobi
By [signature]
Attorney

Patented Sept. 28, 1948

2,450,144

UNITED STATES PATENT OFFICE 2,450,144

ELECTRICAL CONTROL INSTRUMENT

Edward N. Jacobi, Milwaukee, Wis., assignor to Briggs & Stratton Corporation, Milwaukee, Wis., a corporation of Delaware Application March 11, 1943, Serial No. 478,763

9 Claims. (Cl. 200—6)

This invention relates to electrical control instrumentalities and refers particularly to airplane ignition switches.

In aircraft having two or more engines, it is customary to provide each engine with a pair of magnetos for ignition in addition to a magneto booster to aid in starting the engines. It is common practice to control the effectiveness of these magnetos by means of switches operable to selectively ground the magnetos for each engine and to control the connection and disconnection of the magneto boosters in the ignition circuits.

Usually the effectiveness of each pair of magnetos and the boosters therefor is controlled by a separate switch and these switches are in turn grouped together and connected with an "on-off" type master switch capable of grounding all the magnetos in the "off" position of the switch so as to simultaneously break all ignition circuits.

Obviously, therefore, the individual magneto grounding switches may function to selectively control the effectiveness of their magnetos and boosters only when the master switch is in its "on" position.

In addition, the master switch also provides for disrupting all the battery circuits of the plane in its "off" position and is therefore particularly useful for breaking all the electrical circuits during landing of the plane.

Heretofore the nature of the switches described precluded their being grouped together to form a compact rugged electrical control instrument. The various functions for which the switches were employed also rendered the same quite complicated and therefore costly.

The instant invention is concerned with the individual magneto grounding switches, while a divisional application for Letters Patent, Serial No. 794,244 has to do with the master battery switch of my invention which is adapted to be used with the magneto grounding switches described herein.

It is one of the objects of this invention to provide an improved control instrumentality of the character described wherein a novel arrangement of the component parts of the switches produces an exceptionally rugged and compact unit of large capacity.

More specifically, it is an object of this invention to so construct the magneto grounding switches as to remove the springs which afford contact pressure for the switches entirely from the electrical circuits controlled by the switch and to locate these springs as far as possible away from the point of engagement between the stationary and movable contacts of the switches.

Another object of this invention resides in the provision of a switch the movable contacts of which are pressed toward engagement with the stationary contacts by torsion springs.

A further object of this invention consists in the provision of a novel manner of mounting the movable contacts of the switch from their contact carrier and of applying a yielding force to said contacts for the purpose of obtaining contact pressure in the switch-closed position.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best mode so far devised for the practical application of the principles thereof, and in which:

Figure 1 is an elevational view of the control instrument of this invention;

Figure 2 is a left side view of the control instrument shown in Figure 1 having portions of one of the magneto grounding switch housings broken away and in section to illustrate the interior arrangement of the switch;

Figure 3 is a rear elevational view of the control instrument shown in Figure 1;

Figure 6 is a fragmentary detail view looking into one of the individual magneto switch housings and showing the manner in which the limits of rotation of the actuator are defined;

Figure 8 is a view similar to Figure 5 showing a modified type of contact carrier for the magneto grounding switches;

Figure 9 is a cross sectional view taken through Figure 8 on the plane of the line 9—9;

Figure 10 is a perspective view of an insulating washer and bushing for use with the contact carrier of Figure 8 when the same is employed in a battery-type switch; and Figure 11 is a cross sectional view illustrating the manner in which the contact carrier of Figure 8 may be insulated from its actuator.

Figure 4:
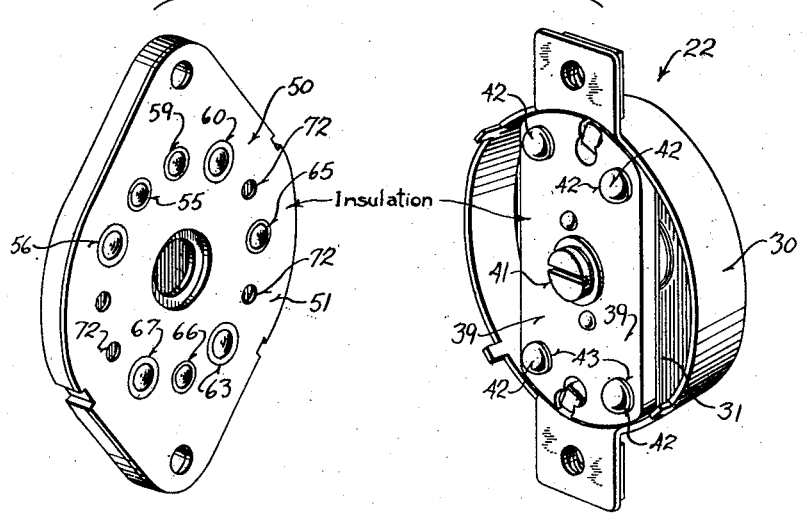
Figure 4 is a perspective view of one of the individual magneto grounding switches having its terminal head separated from the switch housing to illustrate the arrangement of movable and stationary contacts of the switch.

Referring now particularly to the accompanying drawings in which like numerals designate like parts, the numeral 20 designates generally the electric control instrument of this invention, which in the form shown, is especially designed for use with aircraft having two engines. As is customary in two-engine aircraft, the ignition system (not shown) includes a pair of magnetos for each engine and a magneto booster for each engine to aid in starting the same.

Like previous aircraft ignition switches, it is also the purpose of the instrument of this invention to control the ignition circuits in a manner such that either or both of the magnetos of each pair thereof may be rendered ineffective, or both rendered effective simultaneously with their boosters. In addition, the control instrument of this invention also includes a master switch by which all of the magnetos are rendered ineffective simultaneously with disruption of all the battery circuits of the craft.

To this end the instrument comprises two similar "right" and "left" magneto grounding switches 21 and 22 each of which governs the effectiveness of one pair of magnetos and their booster, and an "off-on" type master switch 23 connected with the grounding switches 21 and 22, and by which all of the magnetos and their boosters in addition to the battery circuits of the craft may be rendered ineffective upon actuation to its "off" position.

All three switches are fixed to the rear of a panel 24 (adapted to be secured to the instrument panel of an aircraft) in a position such that actuators 25 and 26 for the grounding switches 21 and 22, and an actuator 27 for the master switch all are accessible at the front of the panel and to an operator of the craft.

Since the grounding switches 21 and 22 are identical except that they are "right" and "left" hand switches, the following description of one will suffice for both.

Referring to Figures 2 and 4, it will be seen that each grounding switch comprises a cup-shaped housing 30 having its bottom wall 31 secured flatwise against the rear of the panel by rivets or other suitable fastening means.

The central portion of the bottom wall of the housing is pressed axially inwardly to provide a cylindrical wall section 32 having a flange 33 projecting radially inwardly therefrom and apertured to receive a stem 34 on the actuator. The cylindrical wall section 32 constitutes a bearing for a hub portion 35 on the actuator, and to preclude relative axial motion of the actuator stem inwardly with respect to the housing, the hub portion thereof has an annular flange 36 one face of which overlies the adjacent bottom wall of the housing.

Axial movement of the actuator stem outwardly from the housing is prevented by a flange 37 formed on an outwardly pressed portion of the panel and engaging behind the other face of the flange 36 on the actuator hub. The flange 37 is apertured to rotatably receive the hub.

Attention is directed to the fact that the actuator is thereby journalled jointly by portions on the panel and switch housing, and is automatically restrained against motion longitudinally of its stem 34 upon securement of the housing to the panel. It is to be observed, however, that the aperture in the panel flange 37 should be of a size to permit passage of the handle portion of the actuator therethrough in assembling the parts.

Figure 5:
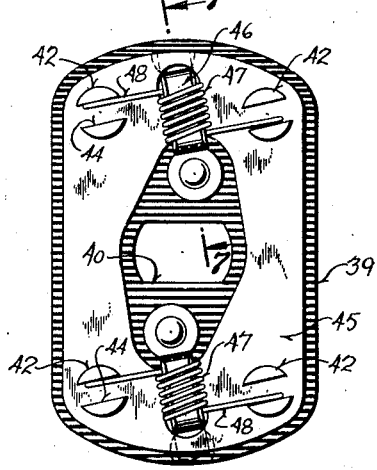
Figure 5 is a rear plan view of the contact carrier for the individual magneto switches.

The stem 34 projects axially into the switch housing and has its inner extremity provided with diametrically opposite flattened portions 38 (see Figure 6) to drivingly receive the movable contact carrier 39 of the switch. The contact carrier 39 as shown in Figures 2, 4 and 5 preferably comprises a sheet of insulating material having a central hole 40 shaped to fit the flattened extremity of the actuator stem so that the contact carrier rotates with the actuator.

The contact carrier is held assembled and against axial motion with respect to the actuator stem by means of a screw 41 threaded into the extremity of the stem 34 and pressing the carrier against the shoulders 34' on the stem formed at the junction of the flattened and cylindrical portions thereof.

The contact carrier 39 is provided with a plurality of movable contacts 42 in the form of plungers each received in a hole 43 in the carrier for sliding motion on an axis substantially parallel to the axis of rotation of the carrier. The holes 43 for the contacts are located at equal radial distances from the axis of the carrier so that the movable contacts lie on a circle concentric to said axis.

The end portions of the movable contacts projecting from the outer face of the carrier are convex in shape while their opposite end portions which project into the housing are bifurcated as at 44 and received in correspondingly shaped openings or recesses in a flexible copper plate 45 overlying the inner face of the contact carrier.

Stirrups 46 secured to the contact carrier and overlying its inner face provide mounting brackets for torsion springs 47 the ends 48 of which project outwardly from the stirrups to bear against the back of the plate 45 directly over the holes 43 in the carrier and between the bifurcated end portions 44 of the contacts.

Figure 7:
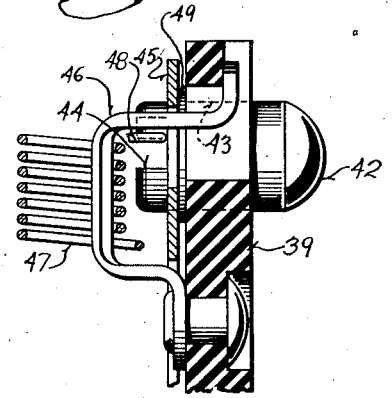
Figure 7 is a cross sectional view taken through Figure 5 on the plane of the line 7—7.

The torsion springs therefore yieldingly force the flexible copper plate 45 toward the inner face of the contact carrier, and this force is translated into an axial force on the contact plungers tending to drive the same outwardly of the carrier by means of annular shoulders 49 formed on each contact plunger and confined between the inner face of the carrier and the face of the plate 45 adjacent thereto. These shoulders 49 also limit outward projection of the contacts under the influence of the torsion springs as will be readily appreciated from Figure 7.

The torsion springs, acting through the copper plate 45, therefore provide contact pressure between the convex end portions of the movable contacts and cooperating stationary contacts 50 carried by a terminal head 51 closing the open end of the housing and secured thereto by screws 52 or their equivalent. The stationary contacts are arranged on the inner face of the terminal head along a circle concentric to the axis of the contact carrier and have their exposed portions concave in shape to be engaged by the convex end portions of the movable contacts with a detent action. It is to be understood, however, that the axial spacing between the carrier and terminal head is such that the terminal head holds the movable contacts in depressed positions against the action of their torsion springs and at which the shoulders 49 are free of the inner face of the carrier even when the contacts are engaged.

Preferably, the adjacent faces of the terminal head and carrier are close together so that the carrier engages and guides the movable contacts close to their convex stationary contact engaging extremities to thereby hold the movable contacts against excessive wobbling.

Attention is directed to the fact that this manner of providing contact pressure is exceptionally desirable and permits a rugged compact switch construction of large capacity. It will be noted that the torsion springs lie on axes close to and parallel with the inner face of the carrier to conserve space, and that they are mounted as far away as possible from the contact engaging portions of the switch and substantially entirely out of the electrical circuit. Consequently, the current carrying capacity of the switch is not limited by loss of tension in the contact springs which results when the springs carry current. It is also to be observed that the flexible copper plate 45 electrically connects all of the movable contacts in addition to transmitting the torsional force of the springs thereto.

As stated, the stationary contacts are arranged in a circle on the terminal head concentric to the axis of rotation of the contact carrier and so that certain of the stationary contacts are engaged by the movable contacts in different positions of the switch.

In the present instance the terminal head 51 is shown provided with eight stationary contacts two of which, designated by the numerals 55 and 56, are connected to each other by a connector 57 on the exterior of the terminal head and to a grounding terminal 58 (Figure 3).

In addition to the grounded contacts 55 and 56 the terminal head is provided with a pair of normally ungrounded stationary contacts 59 and 60 electrically connected to each other by a connector 61 at the exterior of the terminal head and to a terminal 62 which is connectible to the normally ungrounded terminal of one of the magnetos to be controlled by the switch; a stationary contact 63 connected with a terminal 64 on the exterior of the terminal head connectible with the normally ungrounded terminal of a second magneto to be controlled by the switch; and three other stationary contacts 65, 66 and 67 electrically connected together by means of a connector 68 on the exterior of the terminal head and to a third terminal 69 connectible with the normally ungrounded terminal of a magneto booster to be controlled by the switch.

The "right" hand switch 22 obviously does not require a separate ground terminal, it merely being necessary to provide a readily detachable connection between its ground connector 57' and the ground terminal 58 for the switch 21.

The "off" position of the switch is defined by the engagement of a radial lug 70 on the stem 34 of the actuator with one edge 71 of a slot cut in the flange 33 at the recessed central portion of the switch housing as shown in Figure 6, and in this position of the contact carrier the movable contacts engage stationary contacts 55, 60, 63 and 67.

Since one of the movable contacts engages the grounded stationary contact 55, and since all of the movable contacts are electrically connected with each other by the resilient plate 45, it follows that the normally ungrounded terminals 62, 64 and 69 as well as the normally ungrounded terminals of the magnetos and booster connected therewith are simultaneously connected with the ground and therefore rendered ineffective.

Rotation of the contact carrier 39 for the switch 22 as shown in Figures 1 and 4 90° in a counterclockwise direction renders both magnetos and their booster effective. In this position of the contact carrier one of the movable contacts engages the stationary grounded contact 56 while the remaining movable contacts are disposed between other stationary contacts on the terminal head to be received in recesses 72 formed in the inner face of the terminal head and into which the movable contacts snap with a detent action.

This position of the contact carrier is also defined by engagement of the lug 70 on the actuator with the opposite edge 73 of the slot formed in the housing flange 33 (Figure 6).

The stationary contacts on the terminal head are so arranged with respect to the movable contact as to provide two intermediate positions of the switch, one of which is reached by rotation of the contact carrier 39 for the switch 22 in counterclockwise direction from the "off" position of the switch to engage three of the movable contacts 42 with stationary contacts 56, 59, and 66 while the fourth movable contact engages in one of the recesses 72 between the stationary contacts 63 and 65. In this position of the switch the stationary contacts 59 and 66 for one of the magnetos and the magneto booster respectively are connected to ground through the engagement of one of the movable contacts 42 with the grounded stationary contact 56, and said magneto and magneto booster rendered ineffective, while the second magneto connected with the normally ungrounded and unengaged stationary contact 63 remains effective.

In the second intermediate position of the switch defined by engagement of the movable contacts 42 and stationary contacts 55, 65 and 63 and another recess 74 in the inner face of the terminal head with a detent action, the ground connection is removed from the terminal 62 which connects with stationary contacts 59 and 60 thereby rendering the first magneto effective, while the terminals 64 and 69 which connect with the stationary contacts 63 and 65 respectively, are grounded through the engagement of one of the movable contacts with the normally grounded stationary contact 55 thereby rendering the second magneto and the magneto booster ineffective.

The operation of the "left" hand switch 21 is the same as that described for the "right" hand switch shown in Figure 4 with the exception that the contact carrier thereof is rotated in a clockwise direction, as viewed in Figure 1, by its actuator 25, it being understood that the stationary contacts on the terminal head are arranged accordingly to be engaged in the manner described by rotation of the actuator in the clockwise direction.

Since each magneto grounding switch controls two magnetos and a magneto booster, and since each switch has three positions of operativeness designated "L," "R" and "Both" in Figure 1, it follows that either of the two magnetos controlled by each switch may be rendered operative or inoperative as desired, or that both may be rendered effective together with the magneto booster. In the "off" position of the switches the magnetos and their boosters are all rendered ineffective.

The master switch 23 is secured to the panel 24 centrally and above the two grounding switches 21 and 22 and is provided to enable simultaneous grounding of all of the magnetos and their boosters to render the same ineffetive regardless of the positions of operativeness of the magneto switches, and to simultaneously disrupt all battery circuits of the craft merely by actuation of its switch lever 27. This feature of the instrument is especially convenient during landing of the craft, as will be appreciated.

If desired, the contact carriers for the magneto grounding switches 21 and 22 may be made of metal as shown at 135 in Figure 8 rather than insulating material. This embodiment of the invention also employs a flexible copper plate 136 overlying the rear of the carrier as in the previous embodiment, but the movable contacts 42 are shown provided with individual torsion springs 137 pressing against the plate 136 for yieldingly urging the contacts outwardly into engagement with their stationary contacts on the terminal head 44.

When individual torsion springs are used, the contact carrier is provided with slots 138 leading to the periphery of the carrier to partially receive the springs, which are supported by means of pins 139 each having one end embedded in the carrier at the bottoms of the slots therein and anchored to the carrier as at 140. The ends of the pins on which the springs are received are offset as at 141 so that the same are spaced slightly above the plane of the flexible plate 136 electrically connecting all of the movable contacts.

This manner of providing contact pressure is desirable since it permits a degree of rocking motion of the crank-like pins 139 as the springs are flexed during engagement and disengagement of the movable contacts from their cooperating stationary contacts, thereby eliminating one of the causes of fatigue of the metal from which the springs are formed.

While the metal construction for the carrier is ideally suited for grounding switches, it is also possible to use the metal carrier together with the torsion springs in compact battery type switches.

In this instance, however, it becomes necessary to insulate the metal contact carrier from the metal actuating lever for the switch as shown in Figure 11. As here shown, an insulating bushing 142 has its hub 143 disposed between the flattened extremity of the actuator stem and the hole in the carrier and transmits driving torque from the actuator to the carrier. For this purpose the hub of the bushing is provided with a substantially rectangular hole 144 to fit the flattened extremity of the actuator stem, while the exterior of the hub is flattened as at 145 to fit the substantially rectangular hole 146 in the carrier.

The bushing has a flange 146 overlying the outer face of the carrier against which the head of a screw 147 threaded into the actuator stem bears to clamp the carrier against an insulating washer 148 on the flattened portion of the actuator engaged with the shoulders 34' formed by the junctions of the flattened and cylindrical portions of the actuator stem.

From the foregoing description taken in connection with the accompanying drawings, it will be readily apparent that this invention provides an improved electrical instrumentality by which the effectiveness of a number of different magnetos and magneto boosters may be selectively controlled, and in which simplicity and compactness is obtained through a novel manner of providing contact pressure for the contacts of the switches comprising the instrument. It is also a highly important feature of the instrument of this invention that the design of the switches is such as to remove the springs, which afford contact pressure, from the electrical circuits completed through the contacts; and that all of the electrical circuits are led through metal having low resistance to preclude electrolytic action such as results from passing current through such dissimilar metals as brass and aluminum.

What I claim as my invention is:

1. In a switch of the character described: a plurality of stationary contacts; cooperating movable contacts engageable with said stationary contacts; a carrier for the movable contacts for moving the same into and out of engagement with said stationary contacts; means mounting the movable contacts on the carrier for motion relative thereto toward and from the stationary contacts; resilient electrical conducting means at the side of the carrier remote from the stationary contacts for electrically connecting the movable contacts; and means for yieldingly pressing the movable contacts into engagement with the stationary contacts including a torsion spring supported by the carrier alongside said electrical conducting means and having its ends arranged to bear against the electrical conducting means adjacent to its connection with an adjacent pair of movable contacts, and cooperating abutments on the electrical conducting means and the movable contacts through which the torsional force of the spring reacts to yieldingly urge the movable contacts toward the stationary contacts.

2. In a switch of the character described: a plurality of cooperating movable and stationary contacts; a carrier for the movable contacts for moving the same into and out of engagement with the stationary contacts; said movable contacts being in the form of plungers and being received in holes formed in the carrier so that the plungers are movable in said holes relative to the carrier toward and from projected positions engaging their stationary contacts; a torsion spring supported by the carrier at its side remote from the stationary contacts and having its ends overlying a pair of adjacent holes in the carrier and the adjacent ends of the contacts therein; and a resilient metal connecting member at said side of the carrier having portions confined between the ends of the spring and said adjacent ends of the movable contacts for transmitting the torsional force of the spring to said movable contacts to cause the same to be yieldingly projected toward their stationary contacts.

3. In a switch of the character described: a plurality of cooperating movable and stationary contacts; a carrier for the movable contacts for moving the same into and out of engagement with the stationary contacts, said movable contacts being in the form of plungers and being received in holes formed in the carrier so that the plungers are movable in said holes relative to the carrier toward and from projected positions engaging their stationary contacts; a torsion spring for each of the movable contacts by which the contacts are yieldingly urged toward their cooperating stationary contacts; means mounting said torsion springs from the carrier at the side thereof remote from the stationary contacts and with one end of each spring overlying one of said holes in the carrier and the adjacent end of the movable contact therein; and a single resilient metal connecting member engaging said ends of the movable contacts and against which said ends of the torsion springs engage to transmit their torsional force to the movable contacts.

4. In a switch of the character described: a plurality of cooperating movable and stationary contacts; a movable carrier for the movable contacts, said carrier having holes therein to slidably receive the movable contacts so that the movable contacts are projectible toward the stationary contacts; and means for yieldingly urging the movable contacts to projected positions comprising a torsion spring supported from the carrier at its side remote from the stationary contacts and having its opposite ends arranged to overlie an adjacent pair of holes in the carrier and the adjacent ends of the movable contacts therein, and a resilient metal plate engaging said adjacent ends of the movable contacts and through which the torsional force of the spring is translated into an endwise force on the movable contacts to yieldingly urge the same to their projected positions.

5. In a switch of the character described: a plurality of cooperating movable and stationary contacts; a movable carrier for the movable contacts, said carrier having pairs of holes therein each of which slidably receives one of the movable contacts so that the movable contacts are projectible toward the stationary contacts; and means for yieldingly urging the movable contacts to projected positions comprising a torsion spring for each pair of movable contacts, said torsion spring being supported from the carrier at its side remote from the stationary contacts and having its opposite ends arranged to overlie one pair of holes in the carrier and the adjacent ends of the movable contacts therein, and a resilient metal plate engaging said adjacent ends of the movable contacts and through which the torsional force of the springs are translated into endwise forces on the movable contacts to yieldingly urge the same to their projected positions, said plate being recessed to receive said adjacent portions of the movable contacts so that the movable contacts cooperate with the springs to hold the plate assembled with the carrier.

6. In a switch of the character described: a movable contact carrier; a movable contact extending through an aperture in the carrier to opposite sides of the carrier to be guided by said aperture for motion relative to the carrier and to be movable bodily with the carrier toward and from an operative position of the switch in which a portion of the contact exposed at one side of the carrier engages with a stationary contact; and means at the opposite side of the carrier for yieldingly projecting the movable contact through the carrier toward the stationary contact including a torsion spring reacting between said opposite side of the carrier and an adjacent portion of the movable contact.

7. In a switch of the character described: a movable contact carrier; a movable contact extending through an aperture in the carrier to opposite sides of the carrier to be guided by said aperture for motion relative to the carrier and to be movable bodily with the carrier toward and from an operative position of the switch in which a portion of the contact exposed at one side of the carrier engages with a stationary contact; means at the opposite side of the carrier for yieldingly projecting the movable contact through the carrier toward the stationary contact including a torsion spring reacting between said opposite side of the carrier and an adjacent portion of the movable contact; and an actuator for the carrier including a part for receiving and absorbing the reaction of the torsion spring on the carrier.

8. In a magneto grounding switch of the character described: a movable contact carrier; a movable contact plunger received in a hole in the carrier and guided thereby for sliding motion so as to be movable both relatively to the carrier and bodily with the carrier toward and from an operative position of the switch in which a portion of the contact plunger exposed at one side of the carrier engages with a stationary contact; a torsion spring supported on the carrier at the opposite side thereof and remote from the stationary contact for pressing the contact plunger toward the stationary contact; and means for conducting magneto current from said movable contact plunger to ground.

9. In a switch of the character described: a movable contact carrier; movable contact means mounted on said carrier and having a part disposed at one side of the carrier and an extension on said part projecting through a hole in the contact carrier and exposed at the opposite side of the carrier whereby the contact means is guided in said hole for sliding motion relative to the carrier and is movable bodily with the carrier toward and from an operative position of the switch in which said exposed portion of the contact means engages with a stationary contact; a stirrup mounted on the contact carrier; and a spring carried by the stirrup and pressing against said part of the movable contact means to yieldingly project said extension through said hole in the carrier toward the stationary contact, said spring lying at the first designated side of the contact carrier so that the contact carrier and said exposed portion of the contact means lies between the stationary contact and the spring.

EDWARD N. JACOBI

REFERENCES CITED

The following references are of record in the file of this patent:

UNITED STATES PATENTS

| Number | Name | Date |
| --- | --- | --- |
| 1,416,471 | Kavana | May 16, 1922 |
| 1,430,536 | Conrad | Oct. 3, 1922 |
| 1,441,618 | Winning | Jan. 9, 1923 |
| 1,467,947 | Norviel | Sept. 11, 1923 |
| 1,605,352 | Krone | Nov. 2, 1926 |
| 1,618,802 | Bohlman | Feb. 22, 1927 |
| 1,639,539 | Smiley | Aug. 16, 1927 |
| 1,664,110 | Jacobi | Mar. 27, 1928 |
| 1,753,620 | Norviel | Apr. 8, 1930 |
| 2,077,503 | Winning | Apr. 20, 1937 |